(12) United States Patent
Kim et al.

(10) Patent No.: US 9,734,930 B2
(45) Date of Patent: Aug. 15, 2017

(54) CONDUCTIVE RESIN COMPOSITION AND DISPLAY DEVICE USING THE SAME

(71) Applicant: SAMSUNG ELECTRONICS CO., LTD., Suwon-si, Gyeonggi-do (KR)

(72) Inventors: In Kim, Suwon-si (KR); Kyeong Pang, Suwon-si (KR); Song Won Hyun, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 142 days.

(21) Appl. No.: 14/489,005

(22) Filed: Sep. 17, 2014

(65) Prior Publication Data

US 2015/0086790 A1    Mar. 26, 2015

(30) Foreign Application Priority Data

Sep. 24, 2013  (KR) .................. 10-2013-0113547
Feb. 5, 2014   (KR) .................. 10-2014-0013330

(51) Int. Cl.
*C08K 3/04*       (2006.01)
*H01B 1/24*       (2006.01)
(Continued)

(52) U.S. Cl.
CPC ............... *H01B 1/24* (2013.01); *C08K 3/04* (2013.01); *C08K 3/40* (2013.01); *C08L 55/02* (2013.01);
(Continued)

(58) Field of Classification Search
CPC ........................................................ C08K 3/40
See application file for complete search history.

(56) References Cited

U.S. PATENT DOCUMENTS 6,444,736 B1 *   9/2002  Touhara ............... C08K 5/3492
                                                524/100
2002/0183438 A1  12/2002  Amarasekera et al.
(Continued)

FOREIGN PATENT DOCUMENTS

EP         2 204 403         7/2010
KR    10-2011-0087835        8/2011
(Continued)

OTHER PUBLICATIONS

Extended European Search Report mailed Apr. 7, 2016 in European Patent Application No. 14186268.0.
(Continued)

*Primary Examiner* — Christopher Polley
(74) *Attorney, Agent, or Firm* — Staas & Halsey LLP (57) ABSTRACT

Disclosed are a conductive resin composition and a display device using the same. The display device includes a display panel, and a frame having conductivity, in which the display panel is mounted, wherein the frame is formed of a conductive resin composition and the conductive resin composition includes a resin including a polyester copolymer resin, and carbon nanotube (CNT). The conductive resin composition prevents static discharge due to electrical conductivity and improves production efficiency though simplification of the overall manufacturing process. In addition, the conductive resin composition is applicable to thin film molding due to improved moldability and self-extinguishes flames due to flame retardancy.

11 Claims, 4 Drawing Sheets

(51) Int. Cl.
*C08K 3/40* (2006.01)
*C08L 55/02* (2006.01)
*C08L 69/00* (2006.01)
*G02F 1/1333* (2006.01)

(52) U.S. Cl.
CPC ............ *C08L 69/00* (2013.01); *G02F 1/1333* (2013.01); *Y10T 428/31507* (2015.04); *Y10T 428/31786* (2015.04)

(56) References Cited

U.S. PATENT DOCUMENTS

| | | | |
|---|---|---|---|
| 2007/0112107 A1* | 5/2007 | Yamashita | C08K 5/0066 524/115 |
| 2009/0179806 A1 | 7/2009 | Ji et al. | |
| 2012/0212037 A1* | 8/2012 | Bohrmann | B60B 5/02 301/64.702 |
| 2013/0221285 A1 | 8/2013 | Song et al. | |

FOREIGN PATENT DOCUMENTS

| | | |
|---|---|---|
| WO | WO 2014/049572 A2 | 4/2014 |
| WO | WO 2014/049572 A3 | 4/2014 |

OTHER PUBLICATIONS

International Search Report issued Jan. 22, 2015 in International Application No. PCT/KR2014/008753.

European Search Report issued Jan. 26, 2015 in European Application No. 14186268.0.

"Carbon nanotube/epoxy composites fabricated by resin transfer molding", Q.F. Cheng et al., CARBON, vol. 48, Issue 1, pp. 260-266, Sep. 11, 2009.

"Conductivity of microfibrillar polymer-polymer composites with CNT-loaded microfibrils or compatibilizer: a comparative study", eXPRESS Polymer Letters, vol. 7, No. 7, pp. 607-620, Jul. 2013.

* cited by examiner

CONDUCTIVE RESIN COMPOSITION AND DISPLAY DEVICE USING THE SAME

CROSS-REFERENCE TO RELATED APPLICATIONS

This application claims the benefit of Korean Patent Application Nos. 10-2013-0113547 and 10-2014-0013330, respectively filed on Sep. 24, 2013 and Feb. 5, 2014, in the Korean Intellectual Property Office, the disclosure of which is incorporated herein by reference.

BACKGROUND

1. Field

Embodiments of the present disclosure relate to a conductive resin composition which has conductivity and is moldable for application to exterior materials and a display device using the same.

2. Description of the Related Art

A display device displays an image upon receiving an image signal and includes televisions, monitors and the like.

The trends toward miniaturization, weight reduction and multi-functionalization of display devices have brought about an increase in sensitivity of system chips. As a result, there is a need for preventing a phenomenon in which charges are moved between two objects, called "electrostatic discharge (ESD)". Electrostatic discharge causes damage to inner elements of display devices upon assembly production or use of products, resulting in abnormal operation of the display devices.

In order to prevent electrostatic discharge, conductive tapes are adhered to frames. In this case, adhesion of the conductive tapes is performed after an assembly process, thus requiring an additional process and causing deterioration in production efficiency and entailing further cost.

In addition, frames made of a metal material are used to provide conductivity. However, the metal material does not enable weight reduction of display devices due to high specific gravity.

SUMMARY

Therefore, it is one aspect to provide a conductive resin composition which has electrical conductivity and is easily molded and a display device using the same.

Additional aspects will be set forth in part in the description which follows and, in part, will be obvious from the description, or may be learned by practice of the invention.

In accordance with one aspect, a display device includes a display panel, and a frame having conductivity, in which the display panel is mounted, wherein the frame is formed of a conductive resin composition, and the conductive resin composition includes a resin including a polyester copolymer resin, and carbon nanotube (CNT).

The polyester copolymer resin may include at least one of polyethylene terephthalate glycol (PETG) and polycyclohexylene dimethylene terephthalate glycol.

The resin may include a highly flowable polycarbonate (PC) resin having a melt index of about 60 to about 70.

The resin may include a polycarbonate (PC) resin, a polyethylene terephthalate glycol resin, a rubber-modified vinyl graft copolymer resin and a styrene-acrylonitrile (SAN) resin.

The polyethylene terephthalate glycol resin may be present in an amount of about 10% to about 30% by weight with respect to 100% by weight of the resin.

The acrylonitrile butadiene styrene resin is present in an amount of about 7% to about 20% by weight with respect to 100% by weight of the resin.

The carbon nanotube may be present in an amount of about 1 to about 3 parts by weight with respect to 100 parts by weight of the resin.

The conductive resin composition may further include glass fiber.

The glass fiber may be present in an amount of about 15 to about 30 parts by weight with respect to 100 parts by weight of the resin.

The conductive resin composition may further include a flame retardant.

The flame retardant may include at least one of bisphenol-A-bisdiphenyl phosphate and red phosphorus.

The bisphenol-A-bisdiphenyl phosphate may be present in an amount of about 10 to about 25 parts by weight with respect to 100 parts by weight of the resin.

The conductive resin composition may further include a wax.

A mix weight ratio of the carbon nanotube and the wax may be about 4:1 to about 12:1.

The conductive resin composition may further include an additive including at least one of carbon black, a pigment, nanoclay and an antioxidant.

In accordance with an aspect, a conductive resin composition includes 100 parts by weight of a four-component copolymer resin including polycarbonate, polyethylene terephthalate glycol, acrylonitrile butadiene styrene and styrene-acrylonitrile, about 1 to about 3 parts by weight of carbon nanotube, and about 15 to about 30 parts by weight of glass fiber.

The polyethylene terephthalate glycol may be present in an amount of about 10% to about 30% by weight with respect to 100% by weight of the resin.

The acrylonitrile butadiene styrene may be present in an amount of about 7% to 20% by weight with respect to 100% by weight of the resin.

The polycarbonate may include a highly flowable polycarbonate resin having a melt index of about 60 to about 70.

The conductive resin composition may further include a flame retardant including at least one of bisphenol-A-bisdiphenyl phosphate and red phosphorus.

The bisphenol-A-bisdiphenyl phosphate may be present in an amount of about 10 to about 25 parts by weight with respect to 100 parts by weight of the resin.

The conductive resin composition may further include a wax.

The conductive resin composition may further include an additive including at least one of carbon black, a pigment, nanoclay and an antioxidant.

In accordance with another aspect of the present invention, a conductive resin composition includes 100 parts by weight of a copolymer resin including polycarbonate, acrylonitrile butadiene styrene and styrene-acrylonitrile, about 1 to about 3 parts by weight of carbon nanotube, and about 15 to about 30 parts by weight of glass fiber.

The conductive resin composition may further include a flame retardant including at least one of bisphenol-A-bisdiphenyl phosphate and red phosphorus.

The conductive resin composition may further include a wax.

The conductive resin composition may further include an additive including at least one of carbon black, a pigment, nanoclay and an antioxidant.

In accordance with an aspect, an electronic device frame includes a bottom chassis, a top chassis coupled to a front surface of the bottom chassis, a side surface case coupled to a side surface of the bottom chassis, and a rear surface case coupled to a rear surface of the bottom chassis, wherein at least a portion of the bottom chassis, the top chassis, the side surface case and the rear surface case is molded with a conductive resin composition.

The conductive resin composition may include 100 parts by weight of a copolymer resin including polycarbonate, acrylonitrile butadiene styrene and styrene-acrylonitrile, about 1 to about 3 parts by weight of carbon nanotube, about 15 to about 30 parts by weight of glass fiber, and a flame retardant including at least one of bisphenol-A-bisdiphenyl phosphate and red phosphorus.

The composition is manufactured by separately adding the flame retardant and separately adding the glass fiber to a mixture of the copolymer resin and the carbon nanotube.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Hereinafter, embodiments will be described with reference to the accompanying drawings. Hereinafter, a display device is exemplified, but embodiments are not limited thereto and the embodiments may be applied to frames of electronic products requiring electrical conductivity and moldability.

Figure 1:
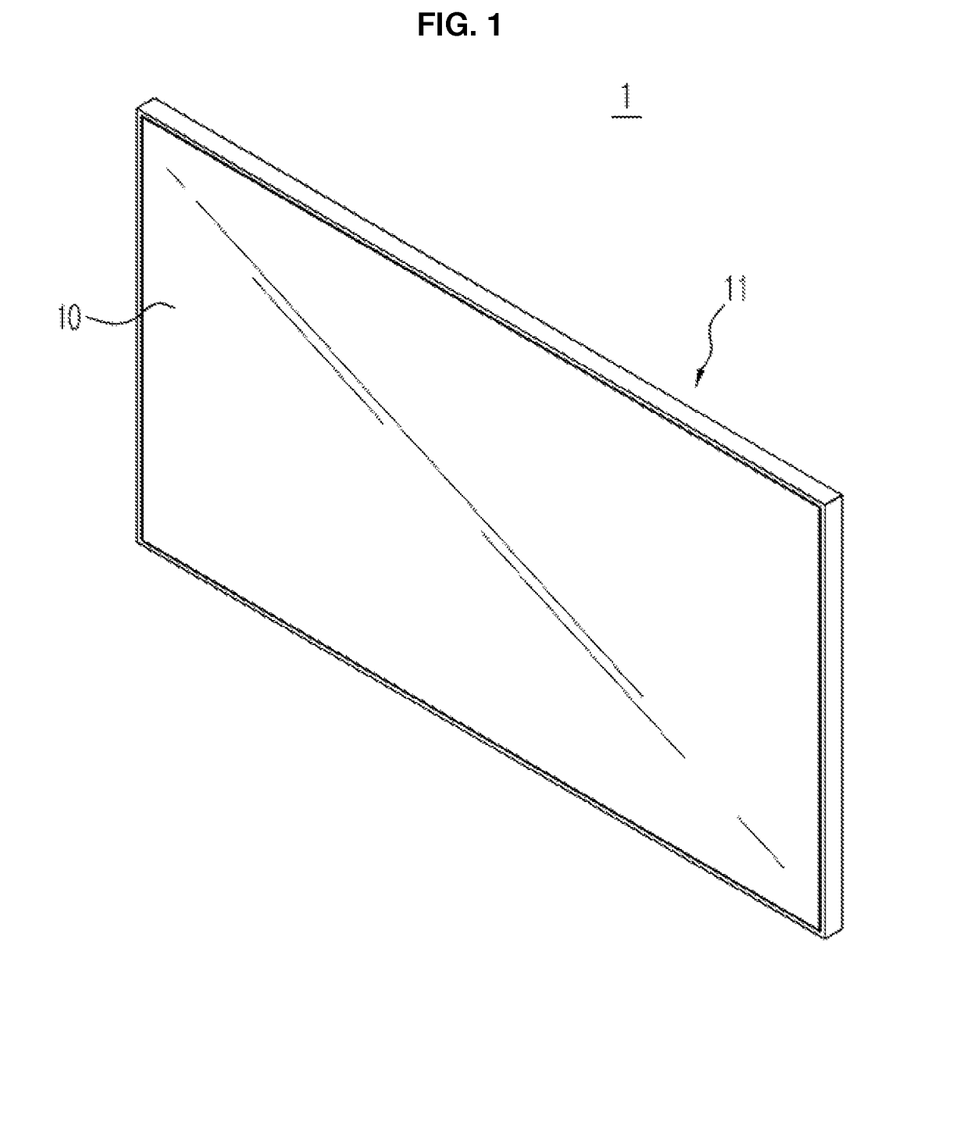
FIG. 1 is a perspective view illustrating a front surface of a display device according to an embodiment.
Figure 2:
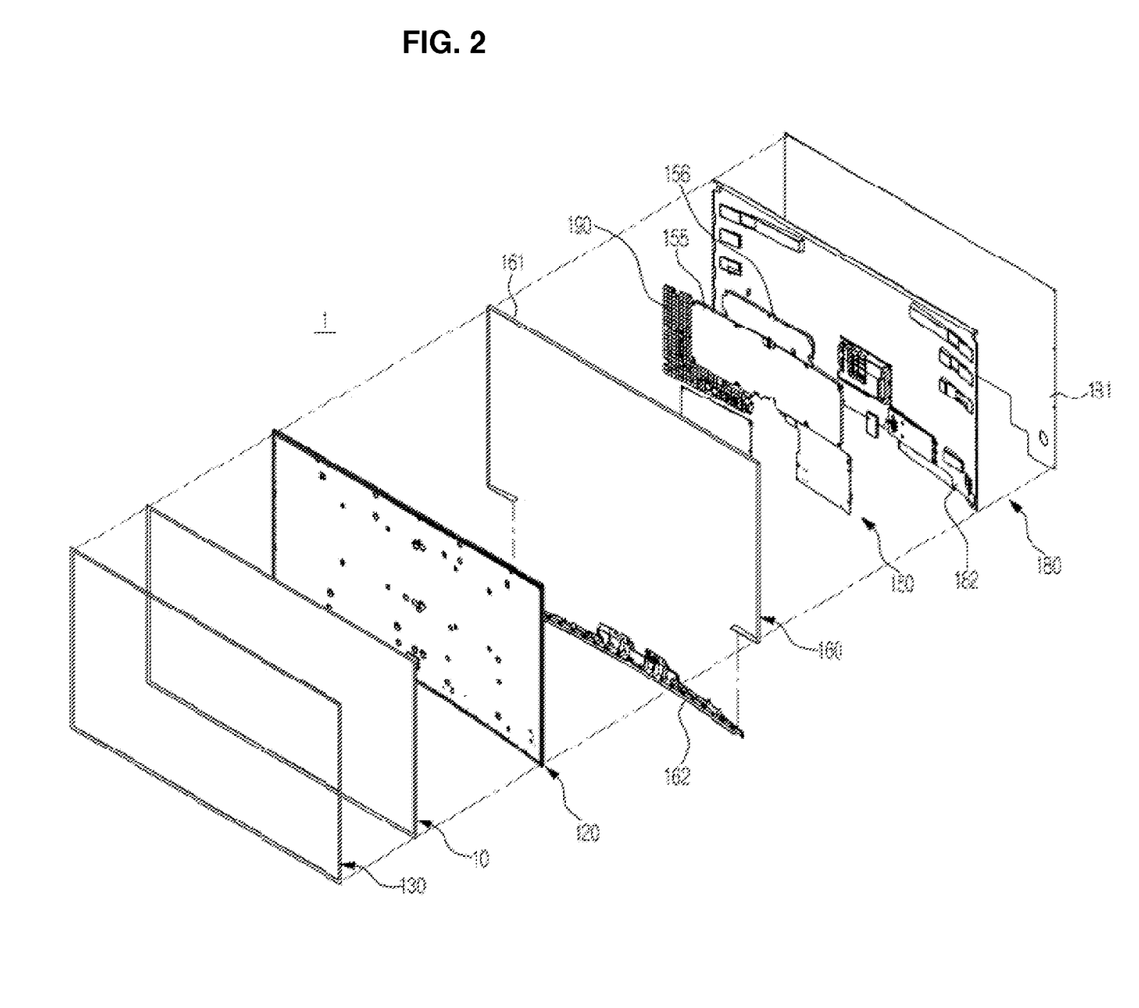
FIG. 2 is an exploded view illustrating a display unit according to an embodiment.

FIG. 1 is a perspective view illustrating a front surface of a display device according to an embodiment and FIG. 2 is an exploded view illustrating a display unit according to an embodiment.

As shown in FIGS. 1 and 2, the display device 1 includes a display panel 10 to display an image and a frame 11 having a rectangular ring shape in which the display panel 10 is mounted. In addition, the display device 1 optionally includes a supporter (not shown) to keep the display panel 10 and the frame 11 stably standing.

As shown in FIG. 2, the display device 1 includes the display panel 10 to display an image, a bottom chassis 120 to support a rear surface of the display panel 10 and a top chassis 130 to cover a front surface perimeter of the display panel 10.

The display device 1 includes a side surface case 160 to form four side surfaces, i.e., upper, lower, left and right surfaces, of the display device 1 and to cover the side surfaces of the display panel 10 and the bottom chassis 120 and a rear surface case 180 adhered to the rear side of the bottom chassis 120 to constitute the rear surface of the display device 1 and cover the rear surface of the bottom chassis 120 and printed circuit boards 150 described below. An outer appearance of the display device 1 is formed by the side surface case 160 and the rear surface case 180.

The display panel 10 may be implemented by an organic light emitting diode panel or a liquid crystal display panel.

A reinforcement member (not shown) to reinforce strength of the bottom chassis 120 is mounted on the front surface of the bottom chassis 120 and a plurality of printed circuit boards 150 to control operation of the display device 1 are mounted on the rear surface of the bottom chassis 120.

The top chassis 130 has a rectangular ring shape and supports the front surface perimeter of the display panel 10 to keep the display panel 10 stably mounted on the bottom chassis 120.

In addition, a heat radiation sheet (not shown), which is made of a material having a high heat transfer coefficient to disperse and dissipate heat generated in the display panel 10 within a relatively short time and a heat insulation sheet (not shown), which is made of an insulating material and is disposed between the bottom chassis 120 and the display panel 10 to prevent heat generated in the display panel 10 from being transferred to the rear side are disposed between the reinforcement member (not shown) and the display panel 10. In the present embodiment, the heat radiation sheet (not shown) is composed of a graphite sheet and the heat insulation sheet (not shown) is composed of a poron sheet.

The printed circuit boards 150 have a structure in which various electrical components are mounted on flat substrates and includes a power supply board connected to an external power supply to supply power to the display device 1, a panel driving board to transfer the power to the display panel 10 and thereby drive the display panel 10, a timing control board to transfer an image signal to the display panel 10, and a signal processing board to perform processing on various images and sound signals.

Insulation sheets 155 and 156 are disposed on the rear surface of the bottom chassis 130 to prevent generation of electrical interference between the power supply board or the panel driving board, and the bottom chassis 130.

A woofer speaker 190 may be disposed at a side of the rear surface of the bottom chassis 130. In an embodiment, the woofer speaker 190 may have an L-shape.

The side surface case 160 may include a first side surface case 161 having an upside down U-shape and a second side surface case 162 to connect the bottom of the first side surface case 161. The second side surface case 162 may be made of a resin material. This enables wireless communication between a Wi-Fi module, a bluetooth module and the like mounted in the display device 1 and external equipment via the second side surface case 162.

The rear surface case 180 may include a back surface plate 181 to form the rear surface of the rear surface case 180 and a support plate 182 adhered to the front surface of the back surface plate 181 to support the printed circuit board 150. An aluminum sheet (not shown) may be adhered to the rear surface of the back surface plate 181.

Hereinafter, a conductive resin composition that may be used for the frame 11 will be described. The conductive resin composition may be used for the side surface case 160, the rear surface case 180, the top chassis 130 and the bottom chassis 120 constituting the outer appearance of the display device 1 according to the embodiment, but the embodiment is not limited thereto and the conductive resin composition may be used for components requiring prevention of electrostatic discharge.

The conductive resin composition according to the embodiment may include a resin including a polyester copolymer resin and carbon nanotubes (CNTs). The polyester copolymer resin include at least one of polyethylene terephthalate glycol (PETG) and polycyclohexylene dimethylene terephthalate glycol.

The resin may include a polycarbonate (PC) resin, a polyethylene terephthalate glycol resin, a rubber-modified vinyl graft copolymer resin and a styrene-acrylonitrile (SAN) resin.

The polycarbonate (PC) used for preparation of the conductive resin composition of the embodiment is not particularly limited and may be prepared by a method well-known to those skilled in the technical field to which the present disclosure pertains or may be selected from commercially available polycarbonate resins.

The polycarbonate (PC) represented by the following Formula 1 may be prepared by reacting a diphenol compound with phosgene, halogen formate or carbonate diester.

[Formula 1]

wherein A is selected from the group consisting of a single bond, C1-C5 alkylene, C1-C5 alkylidene, substituted or unsubstituted C3-C6 cycloalkylene, substituted or unsubstituted C5-C6 cycloalkylidene, —CO—, —S— and —SO$_2$—. In addition, R$_1$ and R$_2$ are each independently selected from the group consisting of substituted or unsubstituted C1-C30 alkyl, and substituted or unsubstituted C6-C30 aryl, and n$_1$ and n$_2$ are each independently integers of 0 to 4. The term "substituted" as used herein that a hydrogen atom is substituted by a substituent selected from the group consisting of a halogen group, C1-C30 alkyl, C1-C30 haloalkyl, C6-C30 aryl, C6-C30 heteroaryl, C1-C20 alkoxy and a combination thereof.

Examples of the compound represented by Formula 1 include 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dichloro-4-hydroxyphenyl)-propane and the like. In addition, the diphenol compound includes compounds such as hydroquinone and resorcinol. Of these, 2,2-bis-(4-hydroxyphenyl)-propane, 2,2-bis-(3,5-dichloro-4-hydroxyphenyl-)propane, 1,1-bis-(4-hydroxyphenyl)-cyclohexane and the like may be used. Polycarbonate is 2,2-bis-(4-hydroxyphenyl)-propane, which is also called "bisphenol-A".

The polycarbonate suitable for preparation of the conductive resin composition according to the embodiments may have a weight average molecular weight of 0,000 to 200,000 g/mol, in particular, 15,000 to 80,000 g/mol, but the embodiment is not limited thereto.

A polycarbonate resin suitable for preparation of the conductive resin composition of the embodiment may include a linear polycarbonate resin, a branched polycarbonate resin or a combination of linear and branched polycarbonate resins.

The linear polycarbonate resin may be a bisphenol A polycarbonate resin, but the embodiment is not necessarily limited thereto. The branched polycarbonate resin may be prepared by adding about 0.05% to about 2 mol % of a multifunctional (tri-functional or more than tri-functional) compound, for example, a compound having three or more phenolic groups, with respect to the total weight of the diphenol compound used for polymerization.

The polycarbonate resin may be a homopolycarbonate resin or a copolycarbonate resin, or a bland of a copolycarbonate resin and a homopolycarbonate resin. The polycarbonate resin may be partially or entirely replaced with an aromatic polyester-carbonate resin obtained by polymerization in the presence of an ester precursor, for example, difunctional carboxylic acid.

A polyester copolymer of the conductive resin composition of the embodiment may be prepared by condensation polymerization of terephthalic acid (TPA), isophthalic acid (IPA), 1,2-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, 2,7-naphthalene dicarboxylic acid, dimethyl terephthalate (DMT) and dimethyl isophthalate (DMI) which are aromatic dicarboxylates having an acidic group substituted by dimethyl, alkyl ester of naphthalene dicarboxylic acid, dimethyl-1,2-naphthenate, dimethyl-1,5-naphthenate, dimethyl-1,7-naphthenate, dimethyl-1,8-naphthenate, dimethyl-2,3-naphthenate, dimethyl-2,6-naphthenate, dimethyl-2,7-naphthenate, a mixture thereof or the like, with a diol such as ethylene glycol, 1,2-propylene glycol, 1,3-propylene glycol, 2,2-dimethyl-1,3propanediol, 2,2-dimethyl-1,3-propylene glycol, 1,3-butanediol, 1,4-butanediol, 1,5-pentanediol, 1,6-hexanediol, 1,3-cyclohexane dimethanol, 1,4-cyclohexane dimethanol or a mixture thereof.

In particular, the polyester copolymer according to the embodiment is a polyethylene terephthalate copolymer containing 1,4-cyclohexane dimethanol (CHDM) represented by the following Formula 2 as a copolymer component. This may be prepared by replacing a part of ethylene glycol constituting the polyethylene terephthalate resin with 1,4-cyclohexane dimethanol.

[Formula 2]

The polyethylene terephthalate glycol (PETG) may be present in an amount of about 10% to about 30% by weight, with respect to 100% by weight of the resin. When the content of the polyethylene terephthalate glycol (PETG) is lower than about 10% by weight, heat deflection temperature may be increased and injection property may be deteriorated. In addition, when the content of the polyethylene terephthalate glycol (PETG) is equal to or higher than about 30% by weight, flame retardancy and heat deflection temperature may be decreased and injection property may be thus deteriorated.

The rubber-modified vinyl graft copolymer of the conductive resin composition of the embodiment may be obtained by graft-polymerizing about 5% to about 95% by weight of a monomer mixture ((1)+(2)) including (1) about 40% to about 95% by weight of styrene, α-methylstyrene, halogen or C1-C4 alkyl-substituted styrene, C1-08 methacrylic acid alkyl ester, C1-08 acrylic acid alkyl ester or a mixture thereof and (2) about 5% to about 60% by weight of acrylonitrile, methacrylonitrile, C1-08 methacrylic acid alkyl ester, C1-08 acrylic acid alkyl ester, maleic anhydride, C1-C4 alkyl or phenyl nucleus substituted maleimide or a mixture thereof, with about 5% to about 95% by weight of a rubber polymer selected from a butadiene rubber, an acrylic rubber, an ethylene/propylene rubber, a styrene/butadiene rubber, an acrylonitrile/butadiene rubber, an isoprene rubber, an ethylene-propylene-diene terpolymer (EPDM), a polyorganosiloxane/polyalkyl(meth)acrylate rubber composite or a mixture thereof.

The rubber-modified vinyl graft copolymer may be for example obtained by graft copolymerizing a butadiene rubber, an acrylic rubber or a styrene/butadiene rubber with styrene and acrylonitrile and optionally a (meth)acrylic acid alkyl ester monomer as a mixture.

In particular, an acrylonitrile butadiene styrene (ABS) graft copolymer or methacrylate butadiene styrene (MBS) may be used.

A content of the acrylonitrile butadiene styrene may be about 7% to about 20% by weight with respect to 100% by weight of the resin. When the content of the acrylonitrile butadiene styrene is lower than about 7% by weight, injection property may be deteriorated. In addition, when the content of the acrylonitrile butadiene styrene is higher than about 20% by weight, injection property and flame retardancy may be deteriorated.

The styrene-acrylonitrile (SAN) resin of the conductive resin composition of the embodiment may be obtained by copolymerizing about 50% to about 90% by weight of an aromatic vinyl monomer with about 10% to about 50% by weight of an unsaturated nitrile monomer. The aromatic vinyl monomer may be styrene, α-methylstyrene, nucleus substituted styrene or the like.

The unsaturated nitrile monomer may be a unsaturated nitrile monomer such as acrylonitrile or methyl methacrylonitrile.

Regarding the conductive resin composition of the embodiment, the carbon nanotube (CNT) has a hollow tubular structure in which graphene with a nanoscale diameter, composed of covalently bonded carbon atoms is rolled. According to the number of walls formed by graphene, carbon nanotubes (CNTs) are divided into single-walled carbon nanotubes, double-walled carbon nanotubes, multi-walled carbon nanotubes and rope carbon nanotubes. In the embodiment, multi-walled carbon nanotubes are used, but the embodiment is not limited thereto.

Examples of methods of synthesizing carbon nanotubes include arc-discharge, laser vaporization, plasma enhanced chemical vapor deposition, thermal chemical vapor deposition, vapor phase growth and the like.

Carbon nanotubes may be coated with a metal material, for example, Ni, $NiP_3$, Cu, Fe, Au, Ag, Pb, Co or Sn.

The carbon nanotubes may have electrical conductivity, but naturally tend to aggregate by Van der Waals force and exhibit deteriorated mechanical properties due to difficulty of uniform dispersion.

The carbon nanotube may be present in an amount of about 1 to about 3 parts by weight, with respect to 100 parts by weight of the resin of the conductive resin composition according to the embodiment of the present invention. When the content of carbon nanotube is lower than about 1 part by weight, electrical conductivity may be deteriorated. When the content of carbon nanotube is higher than about 3 parts by weight, electrical conductivity may be excellent, but moldability may be deteriorated.

The conductive resin composition according to the embodiment may further include glass fiber. The glass fiber may be selected from unidirectional glass fiber, lattice glass fiber, textile glass fiber and equivalents thereof. The glass fiber may be a prepreg wherein a resin is impregnated and is partially cured.

The glass fiber of the conductive resin composition of the embodiment may be present in an amount of about 15 to about 30 parts by weight, with respect to 100 parts by weight of the resin. When the content of the glass fiber is lower than about 14 parts by weight, injection property and electrical conductivity may be deteriorated. In addition, when the content of the glass fiber is higher than about 30 parts by weight, it is unsuitable for use in exterior materials requiring excellent gloss due to bad gloss and mold lifespan is decreased.

The conductive resin composition of the embodiment may further include a flame retardant. The flame retardant may include at least one of bisphenol-A-bisdiphenyl phosphate (BDP) and red phosphorus.

The bisphenol-A-bisdiphenyl phosphate may be present in an amount of about 10 to about 25 parts by weight with respect to 100 parts by weight of the resin. When the content of bisphenol-A-bisdiphenyl phosphate is lower than about 10 parts by weight, flame retardancy may be deteriorated. When the content of bisphenol-A-bisdiphenyl phosphate is higher than about 25 parts by weight, flame retardancy is improved, but mechanical strength and injection property are deteriorated.

More specifically, a mix weight ratio of bisphenol-A-bisdiphenyl phosphate to red phosphorus is about 10:1 to about 25:1.

The conductive resin composition of the embodiment may further include a wax. More specifically, a mix weight ratio of carbon nanotube and wax is about 4:1 to about 12:1.

The conductive resin composition of the embodiment may further include an additive. The additive may include at least one of carbon black, a pigment, nanoclay and an antioxidant.

Figure 3:
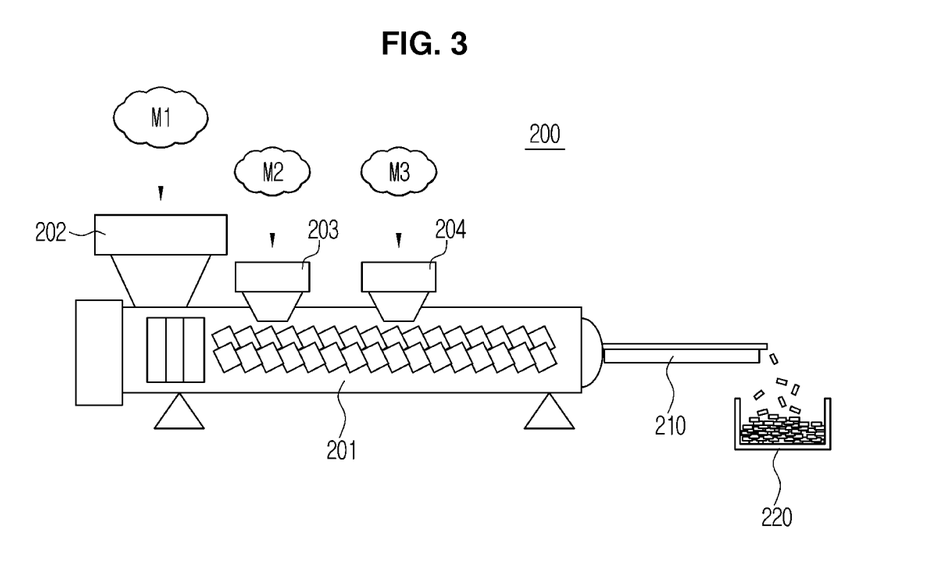
FIG. 3 is a view illustrating a process of preparing a conductive resin composition according to an embodiment.
Figure 4:
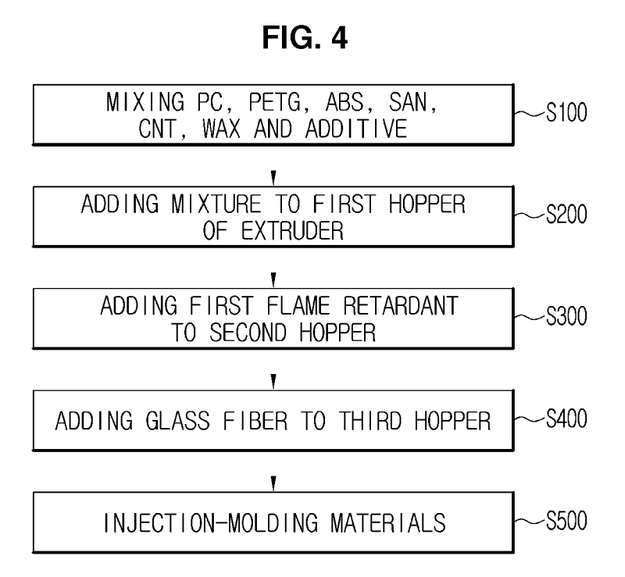
FIG. 4 is a flowchart illustrating the preparation process of the conductive resin composition according to the embodiment.

FIG. 3 is a view illustrating a process of preparing a conductive resin composition according to an embodiment. FIG. 4 is a flowchart illustrating the preparation process of the conductive resin composition according to the embodiment.

As shown in FIGS. 3 and 4, for preparation of the conductive resin composition according to the embodiment, polycarbonate, polyethylene terephthalate glycol, acrylonitrile butadiene styrene, styrene-acrylonitrile (SAN), carbon nanotube, a wax and an additive are mixed in a mixer (S100).

Then, the material mixture M1 is added to a first hopper 202 of a continuous twin-screw extruder 200 (S200). Then, a first flame retardant M2 is added to a second hopper 203 (S300). Glass fiber M3 is added to a third hopper 204 (S400). That is, in FIG. 3, M1 represents a material mixture, M2 represents a first flame retardant and M3 represents glass fiber. The first flame retardant may be bisphenol-A-bisdiphenyl phosphate and a mixture containing the same. The reason for separately adding bisphenol-A-bisdiphenyl phosphate and glass fiber is that bisphenol-A-bisdiphenyl phosphate and glass fiber may be degraded when staying in the continuous twin-screw extruder 200 for a long time. When bisphenol-A-bisdiphenyl phosphate and glass fiber are first fed to the twin-screw extruder, they are degraded during the process and effects of bisphenol-A-bisdiphenyl phosphate and glass fiber in the conductive resin composition are thus decreased. In order to prevent these problems, in this embodiment, the second hopper 203 and the third hopper 204 may be disposed such that bisphenol-A-bisdiphenyl phosphate M2 and glass fiber M3 are fed after the material mixture M1 is fed.

The materials fed to the respective hoppers 202, 203 and 204 are transported to a pressing unit 201 connected to the hoppers 202, 203 and 204, are cooled in a cooling unit 210 and are then pelletized. Then, the materials are dried in an oven 220.

Then, the conductive resin composition pelletized in the twin-screw extruder is injection-molded using a steam mold (S500). Through this process, injection-molded products applicable to display devices and various electronic devices are produced.

Next, the present disclosure will be described in more detail with reference to examples. However, the following comparative examples and examples are provided for only illustration and are not to be construed as limiting the scope of the invention.

Polycarbonate (PC), polyethylene terephthalate glycol (PETG), acrylonitrile butadiene styrene (ABS), styrene-acrylonitrile (SAN), carbon nanotube (CNT), a wax, other additives are mixed in a mixer in accordance with the composition shown in the following Tables 1 and 2 and the resulting mixture is fed to a first hopper of a twin-screw extruder. The bisphenol-A-bisdiphenyl phosphate (BDP) is fed to a second hopper and glass fiber is fed to a third hopper. The materials fed to the twin-screw extruder are subjected to melting/pressing, dispersion and discharge processes. Table 1 represents a composition of Examples and Table 2 represents a composition of Comparative Examples. Here, highly flowable polycarbonate (PC) means polycarbonate having a melt index (MI), indicating flowability of melted substances, of about 60 to about 70.

In the melting/pressing, the temperature is set to about 250° C. to about 255° C., in the dispersion, the temperature is set to about 240° C. to about 250° C., and in the discharging, the temperature is set to about 255° C. to about 260° C. In addition, a rotation rate of each process is set to about 200 to about 300 rpm.

The extrudate having passed through the twin-screw extruder is cooled in a bath as the cooling unit 210 and is pelletized. The resulting pellet is dried in an oven at about 100° C. to produce a specimen. Then, the steam mold is injected to produce a molding component having a thickness of about 1.5 T.

Physical properties are measured using the produced specimen and results are shown in the following Tables 3 and 4.

Volume resistance is measured in accordance with ASTM D257.

Tensile strength is measured in accordance with ASTM D638 using a Type 1 specimen at a tension speed of 3 mm/min and is used as an average of tensile strength values measured five times.

Notched Izod impact strength is measured in accordance with ASTM D265 using a specimen with a size of 63.5×12.7×6.4 mm and is used as an average of values measured five times at room temperature.

Heat deflection temperature is measured in accordance with ASTM D648 using a specimen with a size of 127*12.7*6.4 mm at a stress load of 1.8 Mpa.

Flame retardancy is measured by a UL94 test method defined by Underwriter's Laboratory Inc., US. Flame retardancy is measured using a specimen having a thickness of 1.5 T. This method may be used to evaluate flame retardancy by applying a burner flame to an upright specimen for 10 seconds and measuring an after-flame time or determining drip properties of the specimen. The after-flame time means a duration during which the specimen continues naked ignition after an ignition source is removed from the specimen. Ignition of a face (by drips) is determined on the basis of ignition of an indication face about 300 mm below a bottom end of the specimen by a drip material of the specimen. Flame retardant ratings are shown in Table 5 below.

Melt flow index (MFI) is measured at a temperature of 250° C. and under a load of 10 kgf in accordance with ASTM D1238.

An electrostatic discharge (ESD) withstand voltage test is performed using an ESS-200AX and is performed depending on generation of line defects at voltages of 8 kV and 15 kV. In Tables 3 and 4, "O" represents a case in which line defect is not generated and "X" represents a case in which line defect is generated.

TABLE 1

| Composition | | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|
| Resin | PC | 64 | 64 | 64 | 64 | 44 | 44 | 64 | 64 | 64 | 0 | 0 |
| | PETG | 10 | 10 | 10 | 10 | 30 | 30 | 10 | 10 | 10 | 0 | 0 |
| | ABS | 7 | 7 | 7 | 7 | 7 | 7 | 7 | 7 | 20 | 20 | 20 |
| | SAN | 19 | 19 | 19 | 19 | 19 | 19 | 19 | 19 | 6 | 6 | 6 |
| | Highly flowable PC | 0 | 0 | 0 | 0 | 0 | 0 | 0 | 0 | 0 | 74 | 74 |
| Glass fiber | | 15 | 15 | 30 | 30 | 15 | 15 | 15 | 15 | 15 | 15 | 15 |
| CNT | | 1.0 | 3.0 | 1.0 | 3.0 | 1.0 | 3.0 | 1.5 | 1.5 | 1.0 | 1.5 | 3.0 |
| Wax | | 0.25 | 0.25 | 0.25 | 0.25 | 0.25 | 0.25 | 0.25 | 0.25 | 0.25 | 0.25 | 0.25 |
| BDP | | 10 | 10 | 10 | 10 | 10 | 10 | 10 | 25 | 10 | 10 | 10 |
| Red phosphorus | | 1.0 | 1.0 | 1.0 | 1.0 | 1.0 | 1.0 | 1.0 | 1.0 | 1.0 | 1.0 | 1.0 |
| Additive | | 1.0 | 1.0 | 1.0 | 1.0 | 1.0 | 1.0 | 1.0 | 1.0 | 1.0 | 1.0 | 1.0 |

TABLE 2

| Composition | | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|---|
| Resin | PC | 60 | 60 | 65 | 43 | 64 | 64 | 64 | 64 | 64 | 64 |
| | PETG | 14 | 14 | 9 | 31 | 10 | 10 | 10 | 10 | 10 | 10 |
| | ABS | 7 | 7 | 7 | 7 | 7 | 7 | 7 | 7 | 6 | 21 |
| | SAN | 19 | 19 | 19 | 19 | 19 | 19 | 19 | 19 | 20 | 5 |

TABLE 2-continued

| Composition | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|
| Glass fiber | 15 | 15 | 15 | 15 | 14 | 31 | 15 | 15 | 15 | 15 |
| CNT | 0.9 | 3.1 | 1.0 | 3.0 | 1.0 | 1.0 | 1.5 | 1.5 | 1.0 | 1.0 |
| Wax | 0.25 | 0.25 | 0.25 | 0.25 | 0.25 | 0.25 | 0.25 | 0.25 | 0.25 | 0.25 |
| BDP | 10 | 10 | 10 | 10 | 10 | 10 | 9 | 26 | 10 | 10 |
| Red phosphorus | 1.0 | 1.0 | 1.0 | 1.0 | 1.0 | 1.0 | 1.0 | 1.0 | 1.0 | 1.0 |
| Additive | 1.0 | 1.0 | 1.0 | 1.0 | 1.0 | 1.0 | 1.0 | 1.0 | 1.0 | 1.0 |

TABLE 3

| Physical properties | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|
| Volume resistance | E6 | E3 | E5 | E3 | E5 | E3 | E5 | E5 | E5 | E5 | E3 |
| Tensile strength (kgf/cm$^2$) | 900 | 950 | 1,000 | 1,100 | 900 | 1,100 | 1,150 | 1,010 | 900 | 966 | 971 |
| Notched Izod (kgf·cm/cm) | 5.0 | 4.5 | 5.5 | 4.0 | 5.0 | 4.0 | 4.7 | 4.2 | 5.3 | 5.5 | 4.2 |
| Heat deflection temperature (°C.) | 95 | 95 | 95 | 95 | 80 | 80 | 93 | 85 | 90 | 86 | 84 |
| Flame retardancy | V1 | V1 | V1 | V1 | V2 | V1 | V1 | V0 | V1 | V1 | V1 |
| Melt flow index (g/10 min) | 20 | 20 | 18 | 18 | 28 | 25 | 18 | 25 | 20 | 10.5 | 0.9 |
| Gloss | 45 | 45 | 38 | 38 | 45 | 45 | 40 | 40 | 20 | 45 | 45 |
| Withstand voltage 8 kV | ○ | ○ | ○ | ○ | ○ | ○ | ○ | ○ | ○ | 0 | 0 |
| Withstand voltage 15 kV | ○ | ○ | ○ | ○ | ○ | ○ | ○ | ○ | ○ | 0 | 0 |
| Thin film (≤3T) injection | ○ | ○ | ○ | ○ | ○ | ○ | ○ | ○ | ○ | 0 | 0 |
| Cycle time (sec) | 60 | 60 | 60 | 60 | 60 | 60 | 60 | 60 | 60 | 60 | 60 |

TABLE 4

| Physical properties | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|
| Volume resistance | E12 | E3 | E5 | E3 | E6 | E5 | E5 | E5 | E5 | E5 |
| Tensile strength (kgf/cm$^2$) | 1,000 | 1,150 | 900 | 1,100 | 832 | 1,200 | 1,050 | 1,080 | 890 | 850 |
| Notched Izod (kgf·cm/cm) | 5.1 | 3.2 | 5.0 | 4.0 | 3.7 | 5.7 | 5.3 | 3.0 | 3.5 | 5.3 |
| Heat deflection temperature (°C.) | 95 | 95 | 99 | 75 | 95 | 95 | 95 | 75 | 96 | 78 |
| Flame retardancy | V1 | V1 | V1 | HB | V1 | V1 | HB | V0 | V1 | HB |
| Melt flow index (g/10 min) | 15 | 15 | 12 | 22 | 20 | 17 | 13 | 27 | 14 | 20 |
| Gloss | 45 | 45 | 43 | 43 | 45 | 20 | 44 | 43 | 45 | 46 |
| Withstand voltage 8 kV | X | ○ | ○ | ○ | ○ | ○ | ○ | ○ | ○ | ○ |
| Withstand voltage 15 kV | X | ○ | ○ | ○ | ○ | ○ | ○ | ○ | ○ | ○ |
| Thin film (≤3T) injection | ○ | X | ○ | ○ | X | ○ | X | X | X | ○ |
| Cycle time (sec) | 60 | 60 | 60 | 65 | 60 | 60 | 62 | 64 | 60 | 63 |

TABLE 5

| Items | V2 | V1 | V0 | HB |
|---|---|---|---|---|
| After-flame time of each specimen | ≤30 sec | ≤30 sec | ≤10 sec | Flame retardancy is impossible |
| Total after-flame time of five specimens | ≤250 sec | ≤250 sec | ≤50 sec | |
| Ignition of face (by drips) | Present | Absent | Absent | |

In the case of Examples 1 and 2 of Table 3 wherein the content of carbon nanotube (CNT) is about 1 to about 3 parts by weight, line defects are not generated in an electrostatic discharge withstand voltage test at 8 kV and 15 kV and both Examples 1 and 2 pass the electrostatic discharge withstand voltage test. On the other hand, in Comparative Example 1 of Table 4 wherein the content of carbon nanotube (CNT) is 1 part by weight or less, line defects are generated in an electrostatic discharge withstand voltage test at 8 kV and 15 kV and Comparative Example 1 does not pass the electrostatic discharge withstand voltage test. In addition, Comparative Example 2 wherein the content of carbon nanotube (CNT) exceeds 3 parts by weight passes electrostatic discharge withstand voltage test, but exhibits a notched Izod value of 3.2 (kgf·cm/cm), results in cracks upon thin film (3 T) injection molding and causes problems in moldability.

In addition, Examples 1, 2, 5 and 6 shown in Table 1 wherein the content of polyethylene terephthalate glycol (PETG) is about 10% to about 30% by weight with respect to the weight of the resin have a heat deflection temperature from about 95° C. to about 80° C. As the content (% by weight) of polyethylene terephthalate glycol (PETG) increases, heat deflection temperature decreases. Comparative Example 3 of Table 2 wherein the content of polyethylene terephthalate glycol (PETG) is 9% by weight or less, with respect to the weight of the resin, has a high heat deflection temperature of 99° C. In addition, problems such as weld lines or flowmarks may be generated upon thin film injection due to low melt flow index of 12 (g/10 min). In addition, Comparative Example 4 of Table 2 wherein the content of polyethylene terephthalate glycol (PETG) exceeds about 30% by weight with respect to the weight of the resin has a flame retardant rating of HB wherein flame retardancy is impossible and exhibits an increase in cycle time from 60 seconds to 65 seconds due to low heat deflection temperature of 75° C.

In addition, Examples 1 to 4 shown in Table 1 wherein the content of glass fiber is about 10 to about 30 parts by weight have a tensile strength of about 900 to about 1100 (kgf/cm$^2$) and a notched Izod of 4.0 to 5.5 (kgf·cm/cm). Comparative Example 5 shown in Table 2 wherein the content of glass fiber is 14 parts by weight or less exhibits a tensile strength of 832 (kgf/cm$^2$) and a notched Izod of 3.7 (kgf·cm/cm), thus causing problems associated with thin film (≤3 T) injection molding. In addition, Comparative Example 6 shown in Table 2 wherein the content of glass fiber exceeds 30 parts by weight has a tensile strength of 1200 (kgf/cm$^2$) and a notched Izod of 5.7 (kgf·cm/cm), thus having no problem of thin film (≤3 T) injection molding. However, production of highly glossy injection moldings is impossible due to bad gloss of 20 and mold lifespan is decreased.

In addition, Examples 1 and 9 shown in Table 1 wherein the contents of acrylonitrile butadiene styrene (ABS) are about 7% to about 20% by weight with respect to the weight of the resin have a notched Izod of about 5.0 to about 5.3 (kgf·cm/cm) and a heat deflection temperature of about 90 to about 95° C., thus having no problems associated with physical properties. Comparative Example 9 shown in Table 2 wherein the content of acrylonitrile butadiene styrene (ABS) is 6% by weight or less with respect to the weight of the resin has a notched Izod of 3.5 (kgf·cm/cm) and a melt flow index of 14 (g/10 min), thus having problems associated with mechanical properties and flowability upon injection molding. In addition, Comparative Example 10 shown in Table 2 wherein the content of acrylonitrile butadiene styrene (ABS) exceeds 20% by weight with respect to the weight of the resin exhibits a heat deflection temperature of 78° C., a long cycle time during injection molding of 63 seconds and a flame retardant rating of HB wherein flame retardancy is impossible.

In addition, Examples 7 and 8 shown in Table 1 wherein the content of bisphenol-A-bisdiphenyl phosphate (BDP) is about 10 to about 25 parts by weight exhibit a heat deflection temperature of about 85 to about 93° C., a flame retardant rating of V0 or V1, a tensile strength of about 1010 to about 1150 kgf/cm$^2$ and a notched Izod of about 4.2 to about 4.7 (kgf·cm/cm), thus having no problems associated with physical properties. Comparative Example 7 shown in Table 2 wherein the content of bisphenol-A-bisdiphenyl phosphate (BDP) is 9 parts by weight or less exhibits a melt index of 13 (g/10 min) and a flame retardant rating of HB wherein flame retardancy is impossible, thus having problems associated with injection property and flame retardancy. In addition, Comparative Example 8 shown in Table 2 wherein the content of bisphenol-A-bisdiphenyl phosphate (BDP) exceeds 26 parts by weight exhibits a melt index of 27 (g/10 min) and a flame retardant rating of V0, thus having no problems associated with melt flowability and flame retardancy, but exhibits a notched Izod of 3.0 (kgf·cm/cm) and a heat deflection temperature of 75° C., thus not satisfying physical properties and having a long cycle time upon injection molding.

In addition, Examples 10 and 11 shown in Table 1 are cases in which the content of the highly flowable polycarbonate (PC) resin is about 74% by weight and the content of carbon nanotube (CNT) is about 1.5 to about 3 parts by weight. In these cases, as described above, Examples 10 and 11 pass the electrostatic discharge withstand voltage test due to the carbon nanotube (CNT). In addition, it is seen that tensile strength is about 966 to about 971 (kgf/cm$^2$) and a notched Izod is about 5.5 to about 4.2 (kgf·cm/cm) due to the highly flowable polycarbonate (PC) resin and there is no problem associated with thin film (≤3 T) injection molding. In particular, Examples 10 and 11 exhibit a melt flow index of about 0.9 (g/10 min) to about 10.5 (g/10 min), but exhibit a gloss of 45, thus having no problem associated with injection moldability.

The conductive resin composition according to the embodiment satisfies electrical conductivity, mechanical properties and melt flowability, thus being efficiently injection-molded to produce exterior materials and providing electrostatic discharge effects when used for display devices and home appliances. In particular, the conductive resin composition satisfies injection moldability and mechanical and physical properties upon molding of exterior materials having a thickness of 3 T or less.

As apparent from the fore-going, the conductive resin composition according to an embodiment of the present invention prevents static discharge due to electrical conductivity and improves production efficiency though simplification of the overall manufacturing process.

In addition, the conductive resin composition is applicable to thin film molding due to improved moldability and self-extinguishes flames due to flame retardancy.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A conductive resin composition for an electronic device, the conductive resin composition comprising:
    about 100 parts by weight of a four-component polymer resin mixture comprising polycarbonate, polyethylene terephthalate glycol, acrylonitrile butadiene styrene and styrene-acrylonitrile;
    about 1 to about 3 parts by weight of carbon nanotube;
    about 15 to about 30 parts by weight of glass fiber; and
    a flame retardant comprising bisphenol-A-bisdiphenyl phosphate and red phosphorus having a mix weight ratio of the bisphenol-A-bisdiphenyl phosphate to the red phosphorus of about 10:1 to about 25:1 to provide a flame retardant protection to the electronic device.

2. The conductive resin composition according to claim 1, wherein the polyethylene terephthalate glycol is present in an amount of about 10% to about 30% by weight with respect to 100% by weight of the resin.

3. The conductive resin composition according to claim 2, wherein the acrylonitrile butadiene styrene is present in an amount of about 7% to about 20% by weight with respect to 100% by weight of the resin.

4. The conductive resin composition according to claim 1, wherein the polycarbonate comprises a highly flowable polycarbonate resin having a melt index of about 60 to about 70.

5. The conductive resin composition according to claim 1, further comprising a wax.

6. The conductive resin composition according to claim 1, further comprising an additive comprising at least one of carbon black, a pigment, nanoclay or an antioxidant.

7. The conductive resin composition according to claim 1, wherein the composition is manufactured by separately adding the flame retardant and separately adding the glass fiber to a mixture of the polymer resin mixture and the carbon nanotube.

8. A conductive resin composition for an electronic device, the conductive resin composition comprising:
    about 100 parts by weight of a polymer resin mixture comprising polycarbonate, acrylonitrile butadiene styrene and styrene-acrylonitrile;
    about 1 to about 3 parts by weight of carbon nanotube;
    about 15 to about 30 parts by weight of glass fiber; and
    a flame retardant comprising bisphenol-A-bisdiphenyl phosphate and red phosphorus having a mix weight ratio of the bisphenol-A-bisdiphenyl phosphate to the red phosphorus of about 10:1 to about 25:1 to provide a flame retardant protection to the electronic device.

9. The conductive resin composition according to claim 8, further comprising a wax.

10. The conductive resin composition according to claim 8, further comprising an additive comprising at least one of carbon black, a pigment, nanoclay or an antioxidant.

11. The conductive resin composition according to claim 8, wherein the composition is manufactured by separately adding the flame retardant and separately adding the glass fiber to a mixture of the polymer resin mixture and the carbon nanotube.

* * * * *